(12) United States Patent
Gerecke et al.

(10) Patent No.: US 12,503,089 B2
(45) Date of Patent: Dec. 23, 2025

(54) BRAKE CONTROL SYSTEM FOR A VEHICLE, AND SYSTEM AND VEHICLE THEREWITH, AND METHOD FOR OPERATING A BRAKE CONTROL SYSTEM

(71) Applicant: ZF CV Systems Global GmbH, Bern (CH)

(72) Inventors: Marc Gerecke, Hannover (DE); Ann-Kathrin Posch, Springe (DE); Arne Michaelsen, Seelze (DE); Julian van Thiel, Grossburgwedel (DE); Torsten Wallbaum, Duingen (DE)

(73) Assignee: ZF CV Systems Global GmbH, Bern (CH)

( * ) Notice: Subject to any disclaimer, the term of this patent is extended or adjusted under 35 U.S.C. 154(b) by 191 days.

(21) Appl. No.: 18/507,803

(22) Filed: Nov. 13, 2023

(65) Prior Publication Data

US 2024/0075913 A1 Mar. 7, 2024

Related U.S. Application Data

(63) Continuation of application No. PCT/EP2022/062632, filed on May 10, 2022.

(30) Foreign Application Priority Data

May 11, 2021 (DE) ................. 10 2021 112 207.4

(51) Int. Cl.
*B60T 8/172* (2006.01)
*B60T 7/12* (2006.01)
(Continued)

(52) U.S. Cl.
CPC ............... *B60T 8/174* (2013.01); *B60T 7/12* (2013.01); *B60T 8/172* (2013.01); *B60T 8/18* (2013.01);
(Continued)

(58) Field of Classification Search
CPC . B60T 8/174; B60T 8/18; B60T 8/321; B60T 8/3255; B60W 60/005
See application file for complete search history.

(56) References Cited

U.S. PATENT DOCUMENTS

| 6,314,383 | B1 | 11/2001 | Leimbach et al. |
| 2009/0287388 | A1 | 11/2009 | Bach et al. |

(Continued)

FOREIGN PATENT DOCUMENTS

| DE | 2 164 325 A1 | 6/1973 |
| DE | 197 28 867 A1 | 1/1999 |

(Continued)

OTHER PUBLICATIONS

English translation and Written Opinion of the International Searching Authority dated Oct. 4, 2022 for international application PCT/EP2022/062632 on which this application is based.

(Continued)

*Primary Examiner* — Jacob M Amick
(74) *Attorney, Agent, or Firm* — Walter Ottesen, P.A.

(57) ABSTRACT

A brake control system is for a vehicle containing an internal controller for outputting an internal control variable for at least one brake actuator. An interface receives an external control variable for the at least one brake actuator from an external controller. A decision circuit has at least two inputs for receiving the internal control variable and the external control variable and an output for outputting a control signal for the at least one brake actuator. The control signal depends on the received internal control variable and/or the received external control variable.

16 Claims, 3 Drawing Sheets

(51) Int. Cl.
*B60T 8/174* (2006.01)
*B60T 8/18* (2006.01)
*B60T 8/32* (2006.01)
*B60T 13/66* (2006.01)
*B60W 60/00* (2020.01)

(52) U.S. Cl.
CPC ............ *B60T 8/321* (2013.01); *B60T 8/3255* (2013.01); *B60T 13/662* (2013.01); *B60W 60/005* (2020.02); *B60T 2250/02* (2013.01); *B60T 2250/04* (2013.01)

(56) References Cited

U.S. PATENT DOCUMENTS

| | | | |
|---|---|---|---|
| 2016/0121863 A1* | 5/2016 | Kim | ........................ B60T 7/22 701/70 |
| 2019/0256064 A1 | 8/2019 | Hecker et al. | |
| 2020/0026296 A1 | 1/2020 | Hoedt | |
| 2021/0213928 A1 | 7/2021 | Etzbach et al. | |

FOREIGN PATENT DOCUMENTS

| | | |
|---|---|---|
| DE | 10 2005 041 070 A1 | 3/2007 |
| DE | 10 2016 219 594 A1 | 4/2018 |
| DE | 10 2018 112 846 A1 | 12/2019 |
| DE | 10 2019 214 931 A1 | 4/2021 |
| WO | 2018/050785 A1 | 3/2018 |
| WO | 2018/068944 A1 | 4/2018 |

OTHER PUBLICATIONS

International Search Report of the European Patent Office dated Oct. 4, 2022 for international application PCT/EP2022/062632 on which this application is based.

* cited by examiner

BRAKE CONTROL SYSTEM FOR A VEHICLE, AND SYSTEM AND VEHICLE THEREWITH, AND METHOD FOR OPERATING A BRAKE CONTROL SYSTEM

CROSS-REFERENCE TO RELATED APPLICATIONS

This application is a continuation application of international patent application PCT/EP2022/062632, filed May 10, 2022, designating the United States and claiming priority from German application 10 2021 112 207.4, filed May 11, 2021, and the entire content of both applications is incorporated herein by reference.

TECHNICAL FIELD

The disclosure relates to vehicles with a brake control system for controlling brake actuators, wherein vehicles relating to the disclosure additionally have an autonomous vehicle system configured to perform an autonomous dynamic driving task. In addition, the disclosure relates to a brake control system for such vehicles and a method.

BACKGROUND

Autonomous vehicle systems are becoming increasingly well-known and are configured to control one or more actuators of a vehicle in such a way that a driving task of the vehicle is carried out autonomously without the intervention of a driver. Accordingly, such autonomous vehicle systems also control the acceleration of vehicles partially or completely independently of a human user. In order to operate a vehicle without a driver, different sensors for environmental detection as well as comprehensive computing power for evaluating the sensor data are required. Based on the sensor data, the autonomous vehicle system determines a trajectory for the driving task of the vehicle. In addition, whereas the vehicle follows the trajectory, the autonomous vehicle monitors the environment and modifies the trajectory if necessary.

However, difficulties arise when integrating autonomous vehicle systems into an existing vehicle structure. One of the reasons is that existing, established control systems access existing vehicle actuators, for example during normal operation or in dangerous situations, wherein such access by the autonomous vehicle system must also be enabled in parallel.

Particularly in the case of brake actuators, there is a risk that control of the brake actuators in a dangerous situation by a brake control system will be overridden or influenced by control of the brake actuators by the autonomous vehicle system. This may particularly be the case if the autonomous vehicle system is generally granted access to the brake actuators with comparatively higher priority. For this reason, a brake control system, or at least the safety systems of a brake control system, is given a higher priority than the autonomous vehicle system. This latter approach is known from the prior art and is implemented by a controller of the autonomous vehicle system being connected upstream of an internal controller of a brake control system, which controls the control of the brake actuators and thus the deceleration of a vehicle. This means that the controller of the autonomous vehicle system first determines a control signal for brake actuators and this control signal is adjusted, that is, manipulated, by the internal controller of the brake control system. A control variable at the output of a controller of the autonomous driving system thus serves as a command variable for a controller of a brake control system.

Due to partly different or partly the same sensor systems, which can be accessed by the autonomous driving system on the one hand and the brake control system on the other, there is control in both controllers, which receive different control variables in response to the control. Furthermore, the controllers are also subject to different behavior. This can lead to undesirable effects, as two different controllers essentially act on the same controlled system.

Another way to control the brake actuators is therefore to disconnect them completely. The brake actuators are thus controlled by the brake control system in normal driving mode and by the autonomous vehicle system in autonomous mode. However, it has been shown that in autonomous mode, safety devices particularly established in the brake control system are overridden, and that intervention by the autonomous vehicle system in an emergency during autonomous operation leads to comparatively worse behavior of the vehicle.

SUMMARY

An object of the present disclosure is therefore to counter the defects of the prior art. In particular, an autonomous vehicle system should be able to be integrated into an existing vehicle with a braking system in such a way that non-deterministic controller states of the controllers acting on the brake actuators are avoided and the intervention of brake assistance systems or emergency systems is still possible.

A brake control system is proposed for a vehicle that has an internal controller. The internal controller is preferably a deceleration controller. The internal controller is used to output an internal control variable for at least one brake actuator.

Further, the brake control system contains an interface for receiving an external control variable for the one or more brake actuators from an external controller. In particular, this external controller is an external deceleration controller, particularly preferably of an autonomous vehicle system.

In addition, the brake control contains a decision circuit that has at least two inputs for receiving the internal control variable and the external control variable. The external control variable is therefore fed past the internal controller and is not fed to the internal controller but to the decision circuit as an input.

Furthermore, the decision circuit contains an output for outputting a control signal for at least one brake actuator. The control signal depends on the internal control variable and/or the external control variable. The decision circuit is set up, for example, to determine the control signal depending on the supplied internal control variable and/or the external control variable.

Accordingly, according to the disclosure, a decision circuit is proposed that is part of the brake control system and that decides whether the internal control variable, the external control variable or both control variables are used to generate a control signal for the brake actuator in the decision circuit.

For example, in the case of an autonomous operating mode of the vehicle, the decision circuit can determine that the external control variable is to be used as a control signal for controlling the brake actuator and the brake actuator can be controlled by the external controller. On the other hand, especially in an emergency situation where, for example, an assistance system of the brake control system has to intervene in the autonomous driving mode, the decision circuit of the brake control system can easily switch to the internal control variable, that is, can output the internal control variable as a control signal. Depending on the internal control variable, the brake actuator can be controlled by the control signal generated from the internal control variable and the brake actuator can be controlled by the internal controller. This is possible because the decision circuit itself is part of the braking system, which can be configured to detect this dangerous situation.

According to the disclosure, the decision as to which control variables are used for controlling the brake actuator and thus which controller is to be used is shifted to the brake control system itself. It is therefore no longer necessary to connect several controllers in series. Rather, an autonomous driving mode is possible, while at the same time assistance systems that are already provided in the brake control system can continue to be used.

According to a first embodiment, predefined rules can be stored in the decision circuit. In addition, the decision circuit is set up to decide, depending on these stored rules, whether the internal control variable or the external control variable is to be output as a control signal. Alternatively, the decision circuit is set up to determine a combined control variable depending on the internal control variable and the external control variable and to decide, depending on the rules, whether the internal control variable, the external control variable or the combined control variable is to be output as a control signal. Particularly preferably, the combined control variable is also generated depending on the rules. That is, a rule can state that, under predetermined conditions, a predetermined proportion of the internal control variable and a predetermined proportion of the external control variable are included in the combined control variable.

Thus, the decision circuit can be configured by specifying predefined rules and control of the brake actuator(s) is deterministic by using these rules.

The predefined rules preferably correspond to computer code that is stored in the brake control system or the decision circuit and that has been generated in advance based on experience, verified by tests and stored in the brake control system. Predefined rules can include, for example, that as long as a vehicle is in the autonomous driving mode, the control variable from the external controller is output as a control signal. However, if an emergency situation detected by the brake control system occurs, the system switches to an internal control variable in accordance with the rules, which is output as a control signal.

Furthermore, the combined control variable generated according to the alternative by the decision circuit in the autonomous mode of the vehicle, in which, according to the rules, for example, the external control variable is output as a control signal, enables it to be superimposed according to the rules with a proportion of the internal control variable, that is, a combined control variable is generated if, for example, a driver manually intervenes in the autonomous mode and operates a brake pedal.

According to another embodiment, the interface is further set up to receive an external command variable. The command variable is preferably an external target deceleration. Furthermore, an internal command variable can be provided by the internal controller. This internal command variable is preferably an internal target deceleration of the brake control system. The command variables, namely the external command variable and the internal command variable of the internal controller, correspond to the variables provided to the corresponding controllers for generating the control variables. Thus the external command variable is an input variable of the external controller, whereas the external control variable, which is generated with the external controller depending on the external command variable, is an output variable of the external controller. In contrast, the internal command variable is an input variable of the internal controller, from which the internal controller generates the internal control variable as the output variable of the internal controller.

According to this embodiment, the internal command variable and the external command variable are thus passed by the corresponding controllers or looped through the corresponding controllers so that they are available in the brake control system as input variables for the decision circuit.

The decision circuit is then set up to decide, depending on the internal command variable and the external command variable, using the rules, which of the control variables, that is, preferably whether the internal control variable, the external control variable or the combined control variable, is to be output as a control signal. A decision that depends on the internal command variable and the external command variable involves making a decision by applying the rules directly to the internal command variable and the external command variable. Furthermore, a decision that depends on the internal command variable and the external command variable also includes that a derived internal command variable is first derived from the internal command variable and/or a derived external command variable is derived from the external command variable and then the rules are applied to the derived internal command variable and/or the derived external command variable in order to make a decision. The derivation of the derived internal command variable from the internal command variable and/or the derived external command variable from the external command variable can be done, for example, by conversion, such as multiplication by a factor, division by a divisor and/or by addition or subtraction by a variable or constant. For example, the command variables, namely the internal command variable on the one hand and the external command variable on the other, each correspond to negative acceleration values with units of meters per second squared and which thus correspond to a target deceleration. For example, the derived command variables, namely on the one hand the derived internal command variable and on the other hand the derived external command variable, each corresponds to a speed with units of meters per second and thus corresponds to a target speed. In addition, a decision dependent on the internal and external command variables also includes combinations in which the rules are applied to the derived internal command variable and the external command variable or the internal command variable and the derived external command variable in order to make a decision.

By feeding these command variables to the decision circuit, the decision circuit can decide using the rules which of the control variables is to be output as a control signal. If, for example, one of the command variables is significantly higher than the other in terms of magnitude, this can be seen by the decision circuit, based on the rules, for example, as an indication that the larger command variable corresponds to a brake requirement to be given priority, for example emergency braking, which must also be carried out as a matter of priority. Accordingly, it can then be provided to output the control variable assigned to this command variable as a control signal. Accordingly, the command variables are only fed to the decision circuit to decide which of the control variables is to be output. Preferably, the command variables in the decision circuit are not further processed to generate the control signal itself, but the control signal is only generated depending on the control variables. This ensures that no unexpected additional control is applied to an already controlled variable, namely the internal control variable or the external control variable, by the decision circuit, thus avoiding unexpected or non-deterministic behavior.

According to another embodiment, the brake control system contains a distribution circuit. In addition, the control signal corresponds to a total braking force for the vehicle, which describes, for example, a force that is to be applied to the vehicle against the direction of movement of the vehicle. The distribution circuit is set up to distribute the total braking force to at least two wheels, at least two axles and/or at least two braking devices, that is, to distribute the braking force. The braking devices preferably contain at least friction brakes. Furthermore, the distribution circuit is also set up to control an engine brake, retarder or other braking systems of the vehicle in addition to friction brakes in order to generate the total braking force. Preferably, the distribution circuit is thus used to distribute the total braking force to all wheels of a vehicle or a combination vehicle. Thus, in the case of a combination vehicle, the distribution circuit is preferably set up to distribute the total braking force not only to the wheels of a vehicle of the combination vehicle, which is a towing vehicle and which tows a trailer vehicle of the combination vehicle, but also to assign proportions of the total braking force to the brake actuators of the trailer vehicle.

To determine the distribution, the distribution circuit preferably uses a sensed state and/or a known behavior of the individual brake actuators. A sensed state can be fed to the distribution circuit by sensors of the individual brake actuators and a behavior of the brake actuators can be stored in the distribution circuit. This behavior has been predefined, for example, by programming and/or learned in the distribution circuit by previous braking maneuvers using learning algorithms.

It is therefore advantageous that the external controller also uses the distribution circuit already established in a brake control system since the control signal can also be the external control variable based on a decision of the decision circuit. It is therefore not necessary to provide another distribution circuit for controlling the individual brake actuators or brake systems of a vehicle redundantly in an autonomous vehicle system. Rather, a distribution circuit that is present in the brake control system can also be used by the external controller of an autonomous vehicle system.

According to another embodiment, the decision circuit is set up to always output the external control variable independently of the rules under predefined requirements, that is, always. According to this embodiment, these requirements are met when an external command variable is received from the external controller with a value that corresponds to a predefined value or that is outside or within a predefined range of values. Alternatively, these requirements are met if a changeover signal is received from the external controller. Accordingly, if the decision circuit is configured in such a way that the decision circuit decides on the basis of the input of the internal command variable and the external command variable whether the internal control variable, the external control variable or the combined control variable is output as a control signal, it is provided that in the event that the external command variable assumes a value that lies outside a predefined range, that lies within a predefined range or that corresponds to a certain predefined value, the decision circuit switches to the external control variable by default and the external control variable is thus output as a control signal. For example, in the case of a low speed range, in which a vehicle or combination vehicle has a speed of less than 6 km/h, for example, there is usually no command variable available for a target deceleration. In this case, a fixed predefined value or signal can indicate this unavailable command variable in order to continue to enable correct control of the brake actuators by the external controller.

According to another embodiment, the brake control system contains a mass estimation module. The mass estimation module is used to estimate the mass of a vehicle or a combination vehicle, which includes, for example, a total mass of the vehicle or combination vehicle or individual axle loads of the vehicle or combination vehicle. This estimation of the mass of the vehicle or combination vehicle is carried out in the mass estimation module on the basis of sensor values and/or learned behavior, namely, for example, an actual deceleration of the vehicle or the combination vehicle depending on applied braking forces, which can be monitored and from the monitoring of which the behavior and thus the mass can be learned. The estimated mass can be stored in a memory of the brake control system. According to this embodiment, the brake control system contains a further interface for outputting the stored estimated mass of the vehicle or combination vehicle to the external controller. Alternatively or additionally, the further interface is also set up to receive a mass of the vehicle determined by the external controller.

Further integration of an autonomous vehicle system is thus possible, as it can also access the dimensions of the vehicle stored or learned in the brake control system via the other interface. Due to their special sensor technology and learning algorithms, brake control systems are particularly suitable and are usually configured to determine very precise masses of the vehicle in which the brake control system is integrated. By outputting this mass of the vehicle to an autonomous vehicle system, the external controller of the autonomous vehicle system is thus also enabled to take this mass into account in the control. The control of the autonomous vehicle system is thus improved. The exchange of the masses determined in the external controller on the one hand and in the mass estimation module on the other hand is preferably used for a comparison of the masses used for the two controllers. Furthermore, the mass determined in the external controller can preferably also be used for consideration in the estimation in the mass estimation module.

According to another embodiment, the brake control system contains a brake management circuit. The brake management circuit is set up to provide the internal command variable. On the one hand, this internal command variable is fed to the internal controller for control, namely in order to determine the internal control variable depending on the internal command variable and an actual value that is also supplied, which includes, for example, a current vehicle speed or an actual deceleration. Furthermore, according to the embodiment, this command variable is additionally fed to the decision circuit. Here the brake management circuit preferably contains several input signals in order to generate the command variable in the brake management circuit depending on one or more of these input signals.

According to another embodiment, the brake management circuit is set up to determine the internal command variable depending on a driver's request and/or a safety system of the brake control system. Accordingly, several input signals are fed to the brake management circuit, depending on which the internal command variable is generated. For example, an input signal of the brake management circuit is a signal from a brake pedal that can be used to signal a driver's request, namely a driver's braking request. In addition, different outputs from safety systems are fed as input signals to the brake management circuit. Such safety systems include, for example, an emergency braking system, also known as an Advanced Emergency Braking System (AEBS), stability control systems, such as a so-called Roll Stability Control (RSC) and/or an anti-lock braking system (ABS) and the like.

Therefore, in addition to an input for the signal of a brake pedal, the brake management circuit has at least one input for an external braking request signal, which is also called an XBR signal (Extended Brake Request). For example, the AEBS uses this input for the XBR signal. The XBR signal, the input signals of other safety systems and also of the brake pedal are therefore to be regarded as command variables for the internal controller, that is, as input signals of the internal controller. Thus, these variables differ in particular from the external control variable and the external command variable, which are passed by the internal controller and only fed to the decision circuit for further processing.

The brake management circuit is preferably set up in such a way that, for example, the driver's request is provided as a command variable for the internal controller in a normal driving mode of the vehicle, whereas in an emergency situation the internal command variable is specified by the safety system. The brake management circuit thus switches between a driver's request as the basis for generating the internal command variable to output signals from a corresponding safety system, which intervenes in the normal driving mode if appropriate.

A dedicated module is thus provided for prioritized use of various systems that require access to the brake actuators for the generation of the internal command variable, at least in the case of a normal, non-autonomous driving mode. This is preferably done on the basis of further rules that are also stored in the brake management circuit.

According to another embodiment, the internal controller is an iterative learning controller or contains an iterative learning controller. The internal controller is thus set up to optimize its control quality in a continuous learning process. Furthermore, the decision circuit is set up to pause this learning process with a signal that is transmitted from the decision circuit to the internal controller. Alternatively or additionally, the internal controller is set up to adapt the learning process depending on the external command variable, the external control variable and/or a resulting vehicle behavior, namely on the basis of the monitoring of supplied actual values. The learning process is paused or adapted in the event that the decision circuit decides to output the external control variable or the combined control variable as a control signal.

It is taken into account here that although the internal controller receives actual values of the vehicle state in the event that brake actuators are controlled by the external controller due to the decision of the decision circuit, the command variable applied to the internal controller for this purpose is not responsible for these actual values. Thus, if the learning process of the iterative learning controller were to be continued, a faulty or incorrect behavior that is not based on the output of the internal controller would be learned. In this case, therefore, the control quality would not be optimized, but rather degraded. Therefore, either the external command variable, the external control variable and the resulting vehicle behavior are taken into account in the learning process or the learning process is interrupted in this case.

Further, the disclosure includes a system having a brake control system according to one of the aforementioned embodiments and an external controller, which is particularly preferably an external controller of an autonomous vehicle system. The autonomous vehicle system is also known as the virtual driver (VD).

In addition, the disclosure includes a vehicle having an embodiment of the aforementioned system.

Further, the disclosure includes a method for operating a brake control system. The brake control system is preferably a brake control system according to one of the previously mentioned embodiments, a brake control system of the previously mentioned system or of the previously mentioned vehicle. The method includes outputting an internal control variable from an internal controller of the brake control system for at least one brake actuator and receiving an external control variable via an interface of the brake control system for the at least one brake actuator from an external controller. In addition, the method includes outputting a control signal for the at least one brake actuator depending on the internal control variable and/or the external control variable with a decision circuit of the brake control system.

According to an embodiment of a method, outputting the control signal includes deciding whether the internal control variable or the external control variable is to be output as a control signal, depending on predefined rules stored in the brake control system, and depending on the decision, the internal control variable or the external control variable is to be output as a control signal. Alternatively, the method includes determining a combined control variable depending on the internal control variable and the external control variable. In addition, the method includes deciding according to the alternative, depending on the predefined rules, whether the internal control variable, the external control variable or the combined control variable is to be output as a control signal. Depending on the decision, the internal control variable, the external control variable or the combined control variable is then output as a control signal.

According to another embodiment of the method, an external command variable is additionally received via the interface and an internal command variable is provided. Depending on the internal command variable and the external command variable, the decision circuit uses the rules to decide whether the internal control variable, the external control variable or the combined control variable is to be output as a control signal.

According to another embodiment of the method, the deceleration controller contains an iterative learning controller. The iterative learning controller executes a continuous learning process that optimizes the control quality. The decision circuit pauses the learning process by means of a signal or the learning process is adapted depending on the external command variable, the external control variable and/or the resulting vehicle behavior. This is carried out if the decision circuit decides to output the external control variable or the combined control variable as a control signal.

BRIEF DESCRIPTION OF DRAWINGS

The invention will now be described with reference to the drawings wherein.

DETAILED DESCRIPTION

Figure 1:
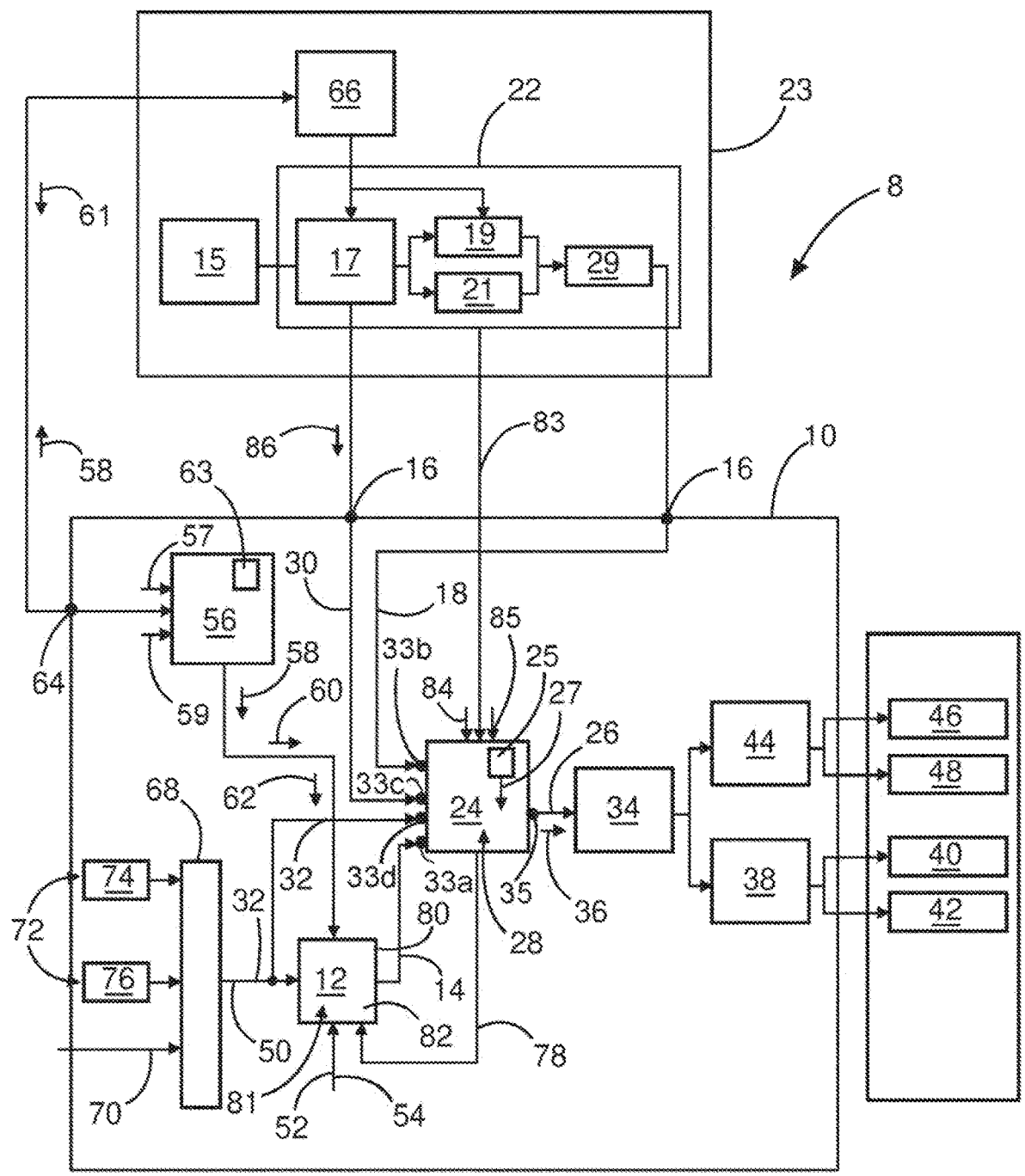
FIG. 1 shows a system with a brake control system according to an embodiment.

FIG. 1 shows a system 8 with a brake control system 10 according to an embodiment. The brake control system 10 contains an internal controller 12 which outputs an internal control variable 14. Furthermore, the brake control system 10 includes an interface 16 with which an external control variable 18 can be received. The internal control variable 14 as well as the external control variable 18 are used to control brake actuators 20. Compared to the internal control variable 14, which is generated in the brake control system 10, namely by the internal controller 12 of the brake control system 10, the external control variable 18, which is received via the interface 16, is generated by an external controller 22. The external controller 22 is part of an autonomous vehicle system 23. The external controller 22, for example, receives specifications of in which direction and how a vehicle should accelerate from a trajectory planning module 15. A control core 17 determines therefrom specifications for a speed controller 19 and a distance controller 21. With an output module 29, various control variables, such as the external control variable 18, are then output for actuating corresponding actuators.

Furthermore, a decision circuit 24 is provided in the brake control system 10, which outputs a control signal 26 for the brake actuators 20 at an output 35. The control signal 26 is output in the decision circuit 24 depending on the internal control variable 14, which is fed to the decision circuit 24 at an input 33a, and/or the external control variable 18, which is fed to the decision circuit 24 at another input 33b. The decision circuit 24 also has a module 25 with which a combined control variable 27 can be generated based on the internal control variable 14 and the external control variable 18. In order to decide which control variable of the internal control variable 14, the external control variable 18 or the combined control variable 27 is output as a control signal 26, predefined rules 28 are stored in the decision circuit 24. These rules 28 preferably correspond to a computer code that is stored in the decision circuit 24. On the basis of these rules 28, an additionally received external command variable 30 generated for the external controller 22 and an internal command variable 32 generated for the internal controller 12 of the brake control system 10, the decision circuit 24 decides which of the control variables 14, 18, 27 is to be output as a control signal 26.

The control signal 26 is fed to a distribution circuit 34 and corresponds to a total braking force 36 for a vehicle or combination vehicle, which is distributed in the distribution circuit 34 to different braking systems and further to the brake actuators 20. Brake actuators 20 include on the one hand system brakes, which act, for example, on several wheels of an axle, and are controlled by a system brake control module 38. Such system brakes include an engine brake 40 and a continuous brake 42, such as a retarder. Furthermore, the brake actuators 20 include friction brakes, which are controlled by a friction brake controller 44. On the one hand here, the friction brakes of a towing vehicle 46 and the friction brakes of a trailer vehicle 48 are controlled.

In order to generate the internal control variable 14 in the internal controller 12, the internal command variable 32, which is also fed to the decision circuit 24, is fed to the controller 12. The internal control variable 14 is determined on the basis of this internal command variable 32, which corresponds to a target deceleration 50, and an actual value 52, which corresponds, for example, to the vehicle speed 54 or an actual deceleration 55.

In addition, a mass estimation module 56 is provided in order to also use in the internal controller 12 an estimated mass 58, which preferably includes a total mass 60 or an axle load 62 of the vehicle or of a combination vehicle, to improve the control. This mass 58 is estimated using sensor values 57 or using behavior 59 learned by the brake control system 10, which is fed to the mass estimation module 56, and is then stored in a memory 63. The estimated mass 58 is further fed to another mass estimation module 66 of the autonomous vehicle system 23 via another interface 64. Thus, the estimated mass of the vehicle 58 can also be used for the external controller 22. Furthermore, the further interface 64 is also set up to receive a mass 61 of the vehicle determined by the external controller 22. This received mass 61 can be used in the mass estimation module 56, for example for improving the estimate of the estimated mass 58 or for comparison with the estimated mass 58.

The internal command variable 32, which corresponds to an internal target deceleration 50, is generated by a brake management circuit 68. Multiple input signals are fed to the brake management circuit 68, such as a driver's request 70 and signals from safety systems 72, such as an RSC 74 or an AEBS system, which is fed as an XBR signal 76. The safety systems 72 are shown here as part of the brake control system 10 but can also be external systems according to another embodiment not shown here. The brake management circuit 68 is then used to decide whether, for example, during a normal journey, the driver's request 70 is used to generate the internal target deceleration 50 or whether there is an emergency situation and one of the safety systems is used to generate the internal target deceleration 50, namely the internal command variable 32.

Furthermore, a signal 78 is provided that is generated by the decision circuit 24 when it outputs the external control variable 18 or the combined control variable 27 as a control signal 26 on the basis of the rules 28. This signal 78 is fed to the internal controller 12, which contains at least one iterative learning controller 80. In this case, the iterative learning controller 80 interrupts its learning process 81 to improve a control quality 82, since the actual values 52 received by the internal controller 12 are not based on the output internal control variables 14, but on the external control variables 18 or at least partly on the external control variables 18.

In addition, a changeover signal 83 is provided, which can be fed to the decision circuit 24 by the external controller 22. If this changeover signal 83 is sent by the external controller 22 and received by the decision circuit 24, the decision circuit 24 always outputs the external control variable 18 as the control signal 26, regardless of the predefined rules 28. The changeover signal is sent, for example, to indicate that no external command variable 30 or only an external command variable with values that cannot be evaluated can be provided by the external controller 22 due to the current driving situation. In the present embodiment, the changeover signal 83 is shown, wherein this changeover signal 83 can be dispensed with according to another advantageous embodiment not shown separately here. For this purpose, predefined values 84 and/or a predefined range of values 85 are stored in the decision circuit. If a value 86 of the external command variable 30 now corresponds to the predefined value 84 or if the value 86 is outside or within the predefined range of values 85, the external control variable 18 is always output as a control signal 26 from the decision circuit 24 regardless of the predefined rules 28, even without providing a change-over signal 83.

Figure 2:
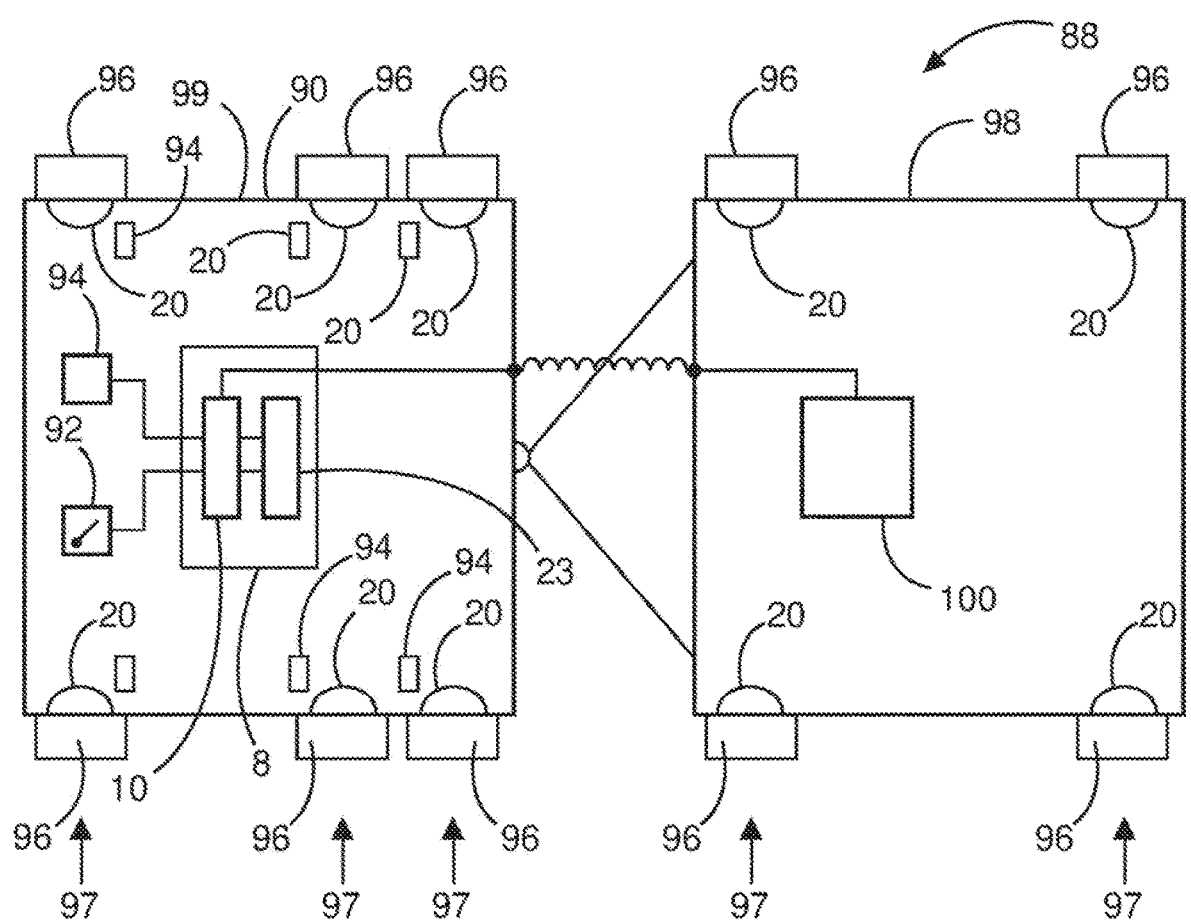
FIG. 2 shows a vehicle with a brake control system.

FIG. 2 shows a combination vehicle 88 that has a vehicle 90 with the system 8. The system 8 contains a brake control system 10 and an autonomous vehicle system 23. The brake control system 10 is connected to a brake pedal 92 to receive a driver's request 70. Furthermore, multiple sensors 94 are connected to the brake control system 10 in order to determine vehicle states, in particular a vehicle speed 54 as an actual value 52. In addition, brake actuators 20 are provided on each wheel 96 of the axles 97 of the vehicle 90, which are friction brakes 46 for example. Furthermore, a trailer vehicle 98 is also provided, which also has wheels 96 with assigned brake actuators 20. The vehicle 90 thus corresponds to a towing vehicle 99 here. Further, the trailer vehicle 98 contains a trailer brake control system 100 which is connected to the brake control system 10 and receives and implements control signals for controlling the brake actuators 20 of the trailer vehicle 98.

Figure 3:
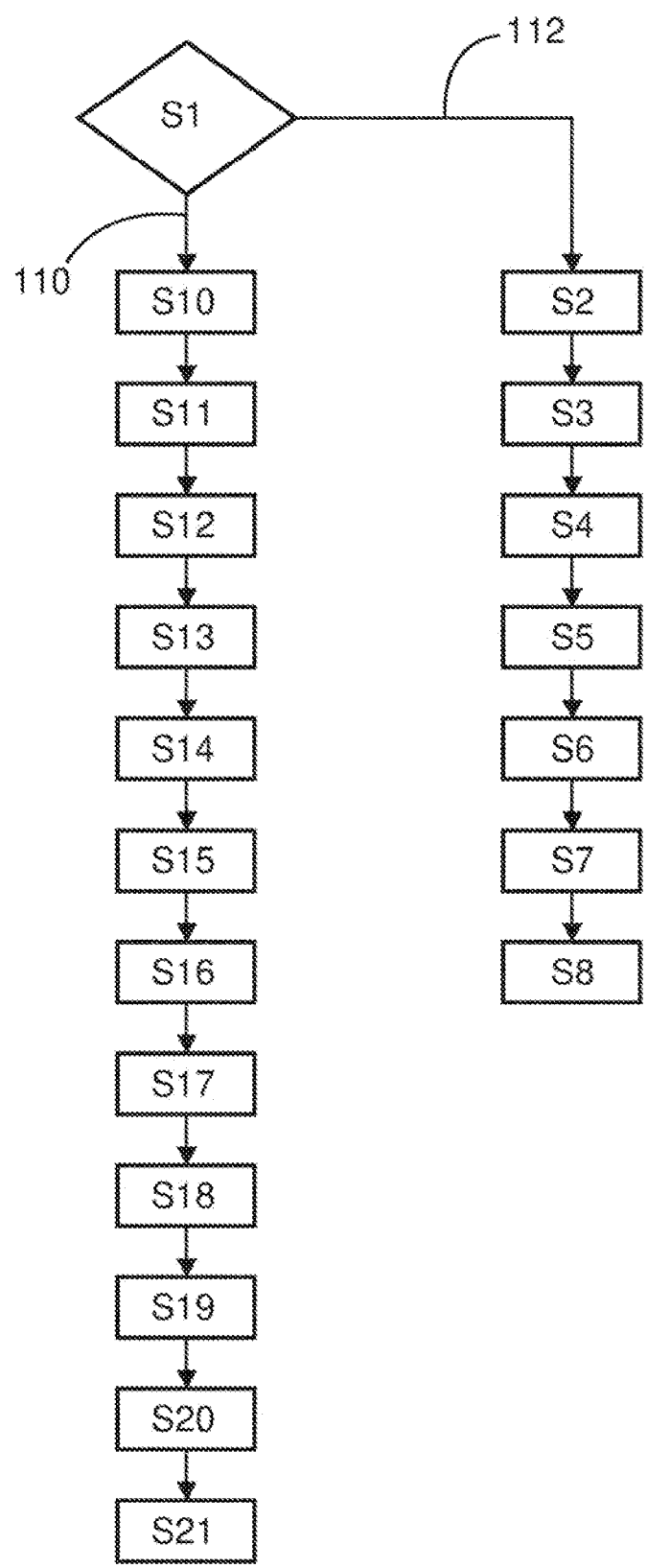
FIG. 3 shows the steps of the method according to an embodiment.

FIG. 3 shows the steps of the method according to an embodiment. In step S1, a specification is used to determine whether a vehicle 90 is in an autonomous operating mode 110 or in a normal operating mode 112. In the normal operating mode 112, in step S2, when a brake pedal is depressed, a braking request 70 is passed to a brake management circuit 68. In step S3, the brake management circuit 68 generates from this braking request 70 an internal command variable 32 which is fed to an internal controller 12. In step S4, in addition to the command variable 32, which represents a target deceleration 50, the controller receives an actual value 52, which corresponds to a vehicle speed 54. Based on the actual value 52 and the internal command variable 32, the internal controller 12 generates an internal control variable in step S5. This internal control variable 14 is then fed to a decision circuit 24. The decision circuit 24 notices that no external control variable 18 is provided by an external controller 22 or that this control variable has a value of zero. On the basis of rules 28 stored in the decision circuit 24, which, for example, prescribe the use of the internal control variable 14 in this case, the decision circuit decides in step S6 that the internal control variable 14 is to be output as a control signal 26. The control signal 26 is distributed in a distribution circuit 34 to different brake systems in step S7 and controls the corresponding brake actuators in step S8. As long as there is a braking request, the steps are repeated.

In the autonomous operating mode 110, an external controller 22 provides an external control variable 18 in step S10, which signals a braking request from an autonomous vehicle system 23. The external control variable 18 is fed to the decision circuit 24, which, based on a rule 28 in step S11, decides, for example, that the external control variable is to be output as a control signal 26, since no internal control variable or an internal control variable with a predefined value of zero is fed to the decision circuit 24. In step S12, therefore, the external control variable 18 is output as a control signal 26. After a braking force distribution in step S13 in the distribution circuit 34, the brake actuators are controlled accordingly in step S14. If an emergency situation is now detected by a safety system 72 in step S15, one of the safety systems 72 sends a braking request to the brake management circuit 68, which generates an internal command variable 32 in step S16 depending on the braking request and feeds it to the internal controller 12. In step S17, the internal controller generates an internal control variable 14 and feeds it to the decision circuit 24. Based on the rules 28, in step S18 the decision circuit 24 detects that in addition to the external control variable 18 there is now an internal control variable 14, which signals, for example, a greater deceleration because it is an emergency situation. In this case, the decision circuit switches from the external control variable 18 to the internal control variable 14 in step S19 and outputs it as a control signal 26. Accordingly, the brake actuators 20 are then controlled with the internal control variable 14 in step S21 after distribution in the distribution circuit 34 in step 20.

It is understood that the foregoing description is that of the preferred embodiments of the invention and that various changes and modifications may be made thereto without departing from the spirit and scope of the invention as defined in the appended claims.

LIST OF REFERENCE [PART OF THE DESCRIPTION]

8 system
10 brake control system
12 internal controller
14 internal control variable
15 trajectory planning module
16 interface
17 control core
18 external control variable
19 speed controller
20 brake actuators
21 distance controller
22 external controller
23 autonomous vehicle system
24 decision circuit
25 module
26 control signal
27 combined control variable
28 predefined rules
29 output module
30 external command variable
32 internal command variable
33a input
33b input
33c input
33d input
34 distribution circuit
35 output
36 braking force
38 system brake control module
40 engine brake
42 continuous braking
44 friction brake control
46 friction brakes of a towing vehicle
48 friction brakes of a trailer vehicle
50 internal target deceleration
52 actual value
54 vehicle speed
55 actual deceleration
56 mass estimation module
57 sensor values
58 mass estimated by the internal controller
59 learned behavior
60 total mass
61 mass determined by the external controller
62 axle load
63 memory
64 interface
66 mass estimation module
68 brake management circuit 70 driver's request
72 safety system
74 RSC
76 XBR
78 signal
80 iterative learning controller
81 learning process
82 control quality
83 changeover signal
84 predefined value
85 predefined range of values
86 value of the external command variable
88 combination vehicle
90 vehicle
92 brake pedal
94 sensors
96 wheel
97 axles
98 trailer vehicle
99 towing vehicle
100 trailer brake control system
110 autonomous operating mode
112 normal operating mode
S1 determine operating mode
S2 transfer braking request to brake management circuit
S3 feed internal command variable to internal controller
S4 controller receives actual value
S5 internal controller 12 generates internal control variable
S6 internal control variable is output as a control signal
S7 distribution of control signal to brake systems
S8 control of brake actuators
S10 provision of external control variable
S11 decision of decision circuit
S12 output external control variable as a control signal
S13 braking force distribution
S14 controlling brake actuators
S15 recognizing emergency situation
S16 generating internal command variable
S17 generating internal control variable
S18 detecting internal control variable
S19 deciding by the decision circuit
S20 distributing in the distribution circuit
S21 controlling the brake actuators

The invention claimed is:

1. A brake control system for a vehicle, the brake control system comprising:
an internal controller for outputting an internal control variable for at least one brake actuator, wherein said internal controller is arranged in the brake control system;
an interface for receiving an external control variable for the at least one brake actuator from an external controller, wherein the external controller is arranged externally with respect to the brake control system;
a decision circuit having at least two inputs receiving said internal control variable and said external control variable and having an output for outputting a control signal for the at least one brake actuator; and,
said control signal being dependent upon at least one of the following:
i) said internal control variable received by said decision circuit; and,
ii) said external control variable received by said decision circuit.

2. The brake control system of claim 1, wherein said decision circuit has predefined rules stored therein and is configured to do the following:
a) decide, in dependence upon said predefined rules, whether said internal control variable or said external control variable is to be output as said control signal; or,
b) determine a combined control variable depending on said internal control variable and said external control variable and to decide, in dependence upon said predefined rules, whether said internal control variable, said external control variable or said combined control variable is to be output as said control signal.

3. The brake control system of claim 1, wherein said decision circuit has predefined rules stored therein; said interface is further configured to receive an external command variable which is used by the external controller for generating said external control variable; and, wherein an internal command variable of said brake control system, which is used by said internal controller for generating said internal control variable can be provided; and, wherein said decision circuit is configured to decide, in dependence upon said internal command variable and said external command variable, using said predefined rules, which one of said control variables is to be output as said control signal.

4. The brake control system of claim 1, wherein said brake control system further comprises a distribution circuit and said control signal contains a total braking force for the vehicle or a combination vehicle; and, said distribution circuit is configured to distribute said total braking force to at least two wheels, at least two axles and/or at least two braking devices.

5. The brake control system of claim 3, wherein said decision circuit is configured to output said external control variable as said control signal independently of said predefined rules if:
a) the external controller receives the external command variable with a value corresponding to a predefined value or lying outside or within a predefined range of values; or,
b) a changeover signal is received by the external controller.

6. The brake control system of claim 1, wherein said brake control system further comprises a mass estimation module for estimating a mass of the vehicle or a combination vehicle including the total mass or individual axle loads of the vehicle or combination vehicle, from at least one of the following: i) sensor values; and, ii) learned behavior; wherein the estimated mass can be stored in a memory of the brake control system; and, wherein the brake control system contains a further interface for at least one of the following: i) outputting the estimated mass to the external controller; and, ii) receiving a mass determined by the external controller.

7. The brake control system of claim 3, wherein the brake control system further comprises a brake management circuit configured to provide said internal controller with said internal command variable and said internal controller is configured to determine said internal control variable depending on an actual value supplied to the internal controller including a current vehicle speed or an actual deceleration, and said internal command variable.

8. The brake control system of claim 7, wherein said brake management circuit is configured to determine said internal command variable in dependence upon at least one of the following: i) a driver's request; and, ii) a safety system.

9. The brake control system of claim 3, wherein said internal controller contains an iterative learning controller configured to optimize the control quality in a continuous learning process; said decision circuit is configured to do at least one of the following: i) pause the learning process with a signal; and, ii) adapt the learning process including depending on at least one of: i) said external command variable; ii) said external control variable; and, iii) a resulting vehicle behavior, if the decision circuit decides to output said external control variable or said combined control variable as said control signal.

10. A system comprising:
an external controller defined by an autonomous vehicle system; and,
a brake control system including:
an internal controller for outputting an internal control variable for at least one brake actuator;
an interface for receiving an external control variable for said at least one brake actuator from said external controller;
a decision circuit having at least two inputs receiving said internal control variable and said external control variable and having an output for outputting a control signal for said at least one brake actuator; and,
said control signal being dependent upon at least one of the following:
i) said internal control variable received by said decision circuit; and,
ii) said external control variable received by said decision circuit.

11. A vehicle comprising:
an external controller:
at least one brake actuator;
a brake control system including an internal controller, an interface, and a decision circuit;
said internal controller being configured to output an internal control variable for said at least one brake actuator, wherein said internal controller is arranged in said brake control system;
said interface being configured to receive an external control variable for said at least one brake actuator from said external controller;
said decision circuit having at least two inputs receiving said internal control variable and said external control variable and having an output for outputting a control signal for said at least one brake actuator; and,
said control signal being dependent upon at least one of the following:
i) said internal control variable received by said decision circuit; and,
ii) said external control variable received by said decision circuit.

12. A method for operating a brake control system including:
an internal controller for outputting an internal control variable for at least one brake actuator; an interface for receiving an external control variable for the at least one brake actuator from an external controller; a decision circuit having at least two inputs receiving said internal control variable and said external control variable and an output for outputting a control signal for said at least one brake actuator; and, said control signal being dependent upon at least one of the following: i) said internal control variable received by said decision circuit; and, ii) said external control variable received by said decision circuit; the method comprising the steps of:
outputting the internal control variable from the internal controller of the brake control system for the at least one brake actuator;
receiving the external control variable via the interface of the brake control system for the at least one brake actuator from the external controller; and,
outputting the control signal for the at least one brake actuator that depends on at least one of: the internal control variable and the external control variable, with a decision circuit.

13. The method of claim 12, wherein outputting the control signal includes:
a) depending on predefined rules, to decide whether the internal control variable or the external control variable is to be output as a control signal and, depending on the decision, to output the internal control variable or the external control variable as a control signal; or,
b) to determine a combined control variable depending on the internal control variable and the external control variable and, depending on the predefined rules, to decide whether the internal control variable, the external control variable, or the combined control variable is to be output as said control signal and, depending on the decision, to output the internal control variable, the external control variable, or the combined control variable as the control signal.

14. The method of claim 13, wherein an external command variable provided for the external controller is received via the interface and an internal command variable provided for the internal controller is generated, wherein the decision circuit decides by applying the predefined rules as to which one of the control variables is output as the control signal depending on the internal command variable and the external command variable.

15. The method of claim 14, wherein the internal controller contains an iterative learning controller which optimizes the control quality in a continuous learning process, wherein the decision circuit does at least one of:
pauses the learning process via a signal and/or adapts the learning process including depending on the external command variable, the external control variable and/or a resulting vehicle behavior, if the decision circuit decides to output the external control variable or the combined control variable as a control signal.

16. The brake control system of claim 4, wherein said at least two braking devices include friction brakes.

* * * * *